United States Patent [19]
Johannes

[11] Patent Number: 4,846,428
[45] Date of Patent: Jul. 11, 1989

[54] ELASTIC FOOT FOR APPARATUS

[75] Inventor: Caspers Johannes, Villingen-Schwenningen, Fed. Rep. of Germany

[73] Assignee: Deutsche Thomson-Brandt GmbH, Fed. Rep. of Germany

[21] Appl. No.: 223,069

[22] PCT Filed: Oct. 7, 1987

[86] PCT No.: PCT/EP87/00580
§ 371 Date: Jun. 20, 1988
§ 102(e) Date: Jun. 20, 1988

[87] PCT Pub. No.: WO88/03316
PCT Pub. Date: May 5, 1988

[30] Foreign Application Priority Data
Oct. 22, 1986 [DE] Fed. Rep. of Germany ....... 3635917

[51] Int. Cl.⁴ .......................................... F16M 11/20
[52] U.S. Cl. .................................................. 248/188.8
[58] Field of Search ................ 248/188.8, 188.9, 546, 248/501, 677; 267/153

[56] References Cited
U.S. PATENT DOCUMENTS

| | | |
|---|---|---|
| 1,915,272 | 6/1933 | Duncan, Jr. ................... 248/188.9 |
| 2,572,718 | 10/1951 | Gifford . |
| 2,641,434 | 6/1953 | Henshaw . |
| 2,743,892 | 5/1956 | Mordarski et al. . |
| 3,601,345 | 8/1971 | Johnson . |
| 4,767,105 | 8/1988 | Caspers ....................... 248/188.9 X |

FOREIGN PATENT DOCUMENTS

| | | |
|---|---|---|
| 3439614 | 4/1986 | Fed. Rep. of Germany . |
| 0410629 | 5/1910 | France ............................. 248/188.9 |
| 0662260 | 12/1951 | United Kingdom . |
| 0690443 | 4/1953 | United Kingdom . |
| 0831473 | 3/1960 | United Kingdom . |

Primary Examiner—Ramon O. Ramirez
Attorney, Agent, or Firm—Max Fogiel

[57] ABSTRACT

An improvement is made to an elastic foot of an apparatus by adding reinforcing rings (8) enabling an increased support surface and thereby a better stability of the compact disc player and of other apparatus placed on said player. A judicious use of these reinforcing rings provides advantageous compensation even for dissymmetry due to uneven loading.

7 Claims, 1 Drawing Sheet

ELASTIC FOOT FOR APPARATUS

BACKGROUND OF THE INVENTION

The invention concerns an elastic (i.e. resilient) foot for an apparatus (component) as disclosed in U.S. Pat. No. 4,767,105.

When feet of the type disclosed in that parent application are employed and several components are stacked on top of a compact-disk player, the unsymmetrical load on the feet of the player may make the stack lean. This situation may occur when the line connections into several components stacked into a tower are all on one side. Feet that are loaded in this way are compressed more than the less loaded feet, and the tower will accordingly tend to lean. The unfortunate result is not only unattractive, but the instability of the upper components in particular can lead to manfunction of the controls.

SUMMARY OF THE INVENTION

The object of the present invention is accordingly to improve stability when the four feet of a compact-disk player are unsymmetrically, or even symmetrically, loaded while maintaining the return motion constant.

Since it is impossible to predict how the owner of a compactdisk player will combine it with other components, it is important to find a flexible solution to the problem.

Further developments and details of the invention will be evident from the subsidiary claims and from the description.

Using reinforcing rings results in the requisite improvement in stability and, since they can be added on or removed later by either the manufacturer or the user, any lack of symmetry or leaning resulting therefrom can easily be compensated for.

One embodiment of the invention will now be specified with reference to the drawing.

DESCRIPTION OF THE PREFERRED EMBODIMENTS

Figure 1:
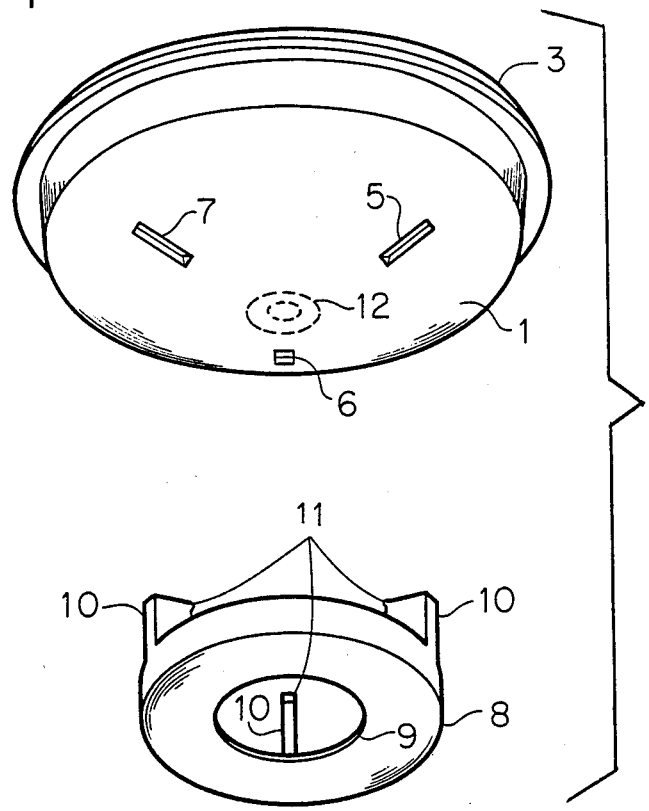
FIG. 1 is a perspective view from below and from one side and an exploded view of the rubber part and a reinforcing ring and FIG. 2 is a side view sectioned at two levels of the assembled rubber part and reinforcing ring.
Figure 2:
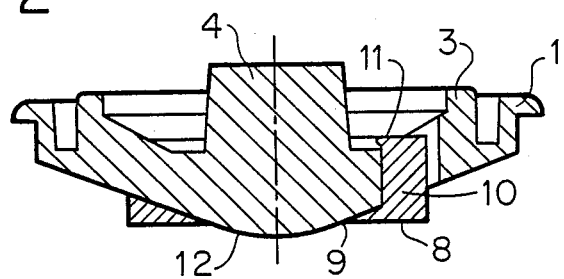

The rubber part has as will be evident from FIG. 1 three rectangular, radially oriented, and equally distributed openings 5, 6, and 7 that accommodate projections 10 on a reinforcing ring 8. Noses 11 on projections 10 engage the resilient material that rubber part 1 is made out of on the other side of openings 5, 6, and 7 and ensure that reinforcing ring 8 will remain in place once it has been forced on, while still allowing it to be removed as necessary. A central convexity 12 on rubber part 1 extends through a central opening 9. When the compact-disk player is employed by itself without load, the situation will be evident from FIG. 2. When it is subjected to load, rubber part 1 will compress (in an unillustrated way) and the flat lower surface of reinforcing ring 8 will provide additional support.

When there is no additional stress, the situation will be as described in the U.S. Pat. No. 4,767,105. When the load is increased, the parameters provided therein with respect to return motion will remain more or less constant, and the reinforcing rings will improve stability as a result of their more extensive supporting surfaces.

In summary, the present invention is concerned with a resilient foot for supporting consumer electronics components, such as compact disk players, in which a reinforcing ring is placed against a rubber member from below. The rubber member has a central convex portion extending through a central opening of the reinforcing ring. The reinforcing ring has a lower surface in contact with a supporting surface at an outer edge of that lower surface. The reinforcing ring, furthermore, has projections on one side that are substantially parallel to the central axis of the ring. The rubber member has openings which correspond in shape to the projections on the ring. These projections extend into the openings in the rubber member, and the projections are integrally formed with the reinforcing ring. The rubber member, moreover, has a surface which contact with the convex portion of the rubber member is flattened under load of the electronic component being supported, the plane passing through the top surfaces of the projections, remains nevertheless spaced from the top surface of the rubber member which is in contact with and supports the electronic component in a resilient manner.

I claim:

1. A resilient foot for consumer-electronics components, particularly compact disk players, comprising: a rubber member; a reinforcing ring positioned against said rubber member from below and having a central opening; said rubber member having a central convex portion extending through said central opening; said reinforcing ring having a central axis and a lower surface in contact with a supporting surface at at least an outer edge of said lower surface; projections on one side of said reinforcing ring and substantially parallel to said central axis; said rubber member having openings corresponding to the shapes of said projections; said projections extending into said openings in said rubber member; said projections being integrally formed with said reinforcing ring on said one side of said reinforcing ring; said rubber member having a surface to be in contact with an electronic component for supporting said component; said projections having an upper surfaces within said rubber member and spaced from said surface to be in contact with said electronic component so that when said convex portion of said rubber member is substantially flattened under load of said component when supporting said component, said upper surfaces of said projections remain spaced from said surface of said rubber member in contact with said electronic component for supporting said component resiliently.

2. A resilient foot as defined in claim 1, wherein said openings in said rubber member comprise three rectangular-shaped, radially oriented, and equally distributed openings for securing said reinforcing ring, said projections corresponding in shape, position adn length of said openings.

3. A resilient foot as defined in claim 1, wherein said projections have radial nose portions shaped integrally with said projections, said nose portoins snapping securely in said openings.

4. A resilient foot as defined in claim 1, wherein said reinforcing ring is compressed of substantially non-resilient material.

5. A resilient foot as defined in claim 1, wherein said reinforcing ring is comprised of plastics.

6. A resilient foot as defined in claim 1, wherein said rubber member is bowl shaped.

7. A resilient foot for consumer-electronics components, particularly compact disk players, comprising: a rubber member; a reinforcing ring positioned against said rubber member from below and having a central opening; said rubber member having a central convex portion extending through said central opening; said reinforcing ring having a central axis and a lower surface in contact with a supporting surface at at least an outer edge of said lower surface; projections on one side of said reinforcing ring and substantially parallel to said central axis; said rubber member having openings corresponding to the shapes of said projections; said projections extending into said openings in said rubber member; said projections being integrally formed with said reinforcing ring on said one side of said reinforcing ring; said rubber member having a surface to be in contact with an electronic component for supporting said component; said projections having an upper surfaces within said rubber member and spaced from said surface to be in contact with said electronic component so that when said convex portion of said rubber member is substantially flattened under load of said component when supporting said component, said upper surfaces of said projections remain spaced from said surface of said rubber member in contact with said electronic component for supporting said component resiliently; said openings comprising three rectangular-shaped, radially oriented, and equally distributed openings for securing said reinforcing ring, said projections corresponding in shape, position and length of said openings; said projections having radial nose portions formed integrally with said projections for snapping into said openings securely; said reinforcing ring being comprised of substantially nonresilient material.

* * * * *